(12) United States Patent
Bingler

(10) Patent No.: US 8,633,623 B2
(45) Date of Patent: Jan. 21, 2014

(54) ENCAPSULATED SUBMERSIBLE PUMP

(75) Inventor: Douglas J. Bingler, Punta Gorda, FL (US)

(73) Assignee: Xylem IP Holdings LLC., White Plains, NY (US)

( * ) Notice: Subject to any disclaimer, the term of this patent is extended or adjusted under 35 U.S.C. 154(b) by 90 days.

(21) Appl. No.: 12/858,970

(22) Filed: Aug. 18, 2010

(65) Prior Publication Data
US 2011/0133582 A1 Jun. 9, 2011

Related U.S. Application Data

(60) Provisional application No. 61/234,738, filed on Aug. 18, 2009.

(51) Int. Cl.
*H02K 11/00* (2006.01)
*H02K 9/19* (2006.01)

(52) U.S. Cl.
USPC .............................. 310/87; 310/43; 310/68 B

(58) Field of Classification Search
USPC ....... 310/43, 58, 60 R, 60 A, 64, 68 R, 71, 87
See application file for complete search history.

(56) References Cited

U.S. PATENT DOCUMENTS

| | | | | |
|---|---|---|---|---|
| 3,041,976 A | * | 7/1962 | Maynard | ........................ 417/357 |
| 3,969,043 A | | 7/1976 | Bright et al. | |
| 4,156,149 A | | 5/1979 | Vaccari | |
| 4,396,353 A | | 8/1983 | MacDonald | |
| 4,437,027 A | * | 3/1984 | Yamamoto et al. | ............. 310/78 |
| 4,437,811 A | | 3/1984 | Iwata et al. | |
| 4,973,231 A | * | 11/1990 | Colliver | ........................ 417/369 |
| 5,055,000 A | | 10/1991 | Akhter | |
| 5,466,127 A | | 11/1995 | Arnswald | |
| 5,613,844 A | | 3/1997 | Tuckey et al. | |
| 5,667,362 A | * | 9/1997 | Murai et al. | ..................... 417/41 |
| 5,806,169 A | | 9/1998 | Trago et al. | |

(Continued)

FOREIGN PATENT DOCUMENTS

| | | |
|---|---|---|
| EP | 0990800 | 5/2000 |
| JP | 60259711 | 12/1985 |
| JP | 2006070729 | 3/2006 |
| WO | 02063166 | 8/2002 |

OTHER PUBLICATIONS 4 pages PCT/US2010/045896 International Search Report mailed Oct. 19, 2010.
English language abstract JP60259711 Dec. 21, 1985.

(Continued)

*Primary Examiner* — Tran Nguyen

(57) ABSTRACT

Apparatus is provided for use in a submersible pump, comprising; a stator having electrical windings and configured with a cavity to receive a rotor of a motor and to provide an electromotive force to drive the rotor arranged inside the cavity; a switch having circuitry configured to response to a level of fluid and control the operation of the stator; and electrical leads and connections configured to electrically couple the stator and the switch, and to provide power to operate the stator and the switch to drive the stator and to turn the electromotive force on and off to control the pumping of the fluid by submersible pump; the stator, the switch and electrical leads and connections being at least partly encapsulated in a material so as to form an encapsulated stator assembly with a watertight seal to prevent fluid from contacting the electrical windings, the circuitry of the switch and the electrical leads and connections.

12 Claims, 9 Drawing Sheets

(56) References Cited

U.S. PATENT DOCUMENTS

| | | | |
|---|---|---|---|
| 5,929,549 A | 7/1999 | Trago et al. | |
| 6,020,661 A * | 2/2000 | Trago et al. | 310/43 |
| 6,057,613 A | 5/2000 | Trago | |
| 6,065,946 A * | 5/2000 | Lathrop | 417/423.14 |
| 6,086,339 A | 7/2000 | Jeffrey | |
| 6,167,965 B1 | 1/2001 | Bearden et al. | |
| 6,209,259 B1 | 4/2001 | Madigan et al. | |
| 6,300,695 B1 | 10/2001 | Neal | |
| 6,362,554 B1 * | 3/2002 | Neal | 310/216.003 |
| 6,433,536 B1 | 8/2002 | Yundt et al. | |
| 6,437,464 B1 | 8/2002 | Neal | |
| 6,443,715 B1 | 9/2002 | Mayleben et al. | |
| 6,455,960 B1 | 9/2002 | Trago et al. | |
| 6,481,973 B1 | 11/2002 | Struthers | |
| 6,501,616 B1 | 12/2002 | Neal | |
| 6,562,460 B1 | 5/2003 | Bayless | |
| 6,617,721 B1 | 9/2003 | Neal | |
| 6,659,737 B2 * | 12/2003 | Bader et al. | 417/366 |
| 6,705,581 B2 | 3/2004 | Trago et al. | |
| 6,753,628 B1 | 6/2004 | Neal | |
| 6,833,191 B2 | 12/2004 | Bayless | |
| 6,844,636 B2 * | 1/2005 | Lieu et al. | 310/43 |
| 6,892,439 B1 | 5/2005 | Neal et al. | |
| 6,899,958 B2 | 5/2005 | Bayless | |
| 6,911,166 B2 | 6/2005 | Neal | |
| 6,941,640 B2 | 9/2005 | Neal et al. | |
| 7,019,422 B2 | 3/2006 | Neal et al. | |
| 7,036,207 B2 | 5/2006 | Neal | |
| 7,049,715 B2 * | 5/2006 | Neal | 310/43 |
| 7,067,944 B2 * | 6/2006 | Lieu et al. | 310/43 |
| 7,067,952 B2 * | 6/2006 | Neal | 310/254.1 |
| 7,154,200 B2 * | 12/2006 | Neal | 310/43 |
| 7,190,548 B2 | 3/2007 | Neal et al. | |
| 7,262,527 B2 | 8/2007 | Neal | |
| 7,297,404 B2 | 11/2007 | Bayless | |
| 7,757,340 B2 * | 7/2010 | Sawalski | 15/300.1 |
| 2002/0106290 A1 * | 8/2002 | Bader et al. | 417/366 |
| 2005/0214143 A1 | 9/2005 | Stirling et al. | |
| 2006/0066155 A1 * | 3/2006 | Matin et al. | 310/52 |
| 2006/0213025 A1 * | 9/2006 | Sawalski | 15/344 |
| 2007/0048157 A1 | 3/2007 | Collins et al. | |
| 2007/0152523 A1 * | 7/2007 | Bookout | 310/87 |
| 2007/0286752 A1 | 12/2007 | Hanke et al. | |
| 2008/0056911 A1 | 3/2008 | Hanke et al. | |

OTHER PUBLICATIONS

English Language Abstract JP2006070729 Mar. 16, 2006.

* cited by examiner

ENCAPSULATED SUBMERSIBLE PUMP

CROSS REFERENCE TO RELATED APPLICATIONS

This application claims benefit to provisional patent application No. 61/234,738, filed 18 Aug. 2009, which is hereby incorporated be reference in its entirety.

BACKGROUND OF THE INVENTION

1. Field of the Invention

The present invention relates to a technique for encapsulating a stator assembly; and more particularly relates to apparatus for use in a submersible pump having an encapsulated stator assembly that provides a watertight seal to electrical components of a stator, a switch and electrical leads and connections coupling these components together.

2. Brief Description of Related Art

Current centrifugal waste water and sump pump technology incorporates a pump that is often assembled utilizing a motor, seals, housing, pump chamber, wire termination, and a separate switch that is responsible for turning the pump on and off, depending on the water level. This technology is susceptible to problems when electrical components come in contact with fluid.

A patentability search was also conducted on embodiments of the present invention and other technology of interest was developed, including, by way of example, the following:

U.S. Pat. No. 7,154,200, which discloses a motor for a hard drive in a computer having an stator assembly having a body of thermoplastic material that encapsulates a stator, where the thermoplastic material has a coefficient of linear thermal expansion such that the thermoplastic material contracts and expands at approximately the same rate as one or more solid parts within or near the body, such as a steel bearing case; and also discloses that its encapsulated stator is formed for arranging inside the rotor of the hard drive motor inside;

U.S. Patent Publication no. US2007/0048157, which discloses a bilge pump having an electric-field effect sensor embedded in its thermoplastic casing for turning the pump on/off depending on the fluid level;

U.S. Pat. No. 3,969,043, which discloses a submersible encapsulated pump and motor assembly, which comprises a molded housing assembly, and includes a process cooled submersible pump and motor assembly and which includes a drive shaft supported by self aligning bearing and motor immersed in coolant fluid;

E. P. No. 09 90 800, which discloses a forced closed-loop cooling for a submersible pump motor, which comprises a sump pump system for electrical motors on submersible pumps that has a motor housing surrounded by coolant jacket;

U.S. Pat. No. 5,466,127, which discloses a device for switching a submersible motor-driven pump on and off, which comprises a submersible pump switching device using external pressure transducer, has adjustable hysteresis in ohmic resistance circuit responsive to pressure on semiconductor overlayer between comb electrodes;

U.S. Pat. No. 6,167,965, which discloses an electrical submersible pump (ESP), which comprises an extensively instrumented with sensors, local processors, and local memory;

U.S. Pat. No. 4,396,353 discloses a submersible sump pump with control system, which comprises an optical sensor to generate signal indicating that water level is sufficient for pump operation;

U.S. Pat. No. 6,481,973, which discloses a variable-speed submersible pump, which comprises a centrifugal pump, with a grinder for entrained solids at the intake, driven by a variable-speed 3-phase AC motor, and which includes a microcontroller which controls the pump output on the basis of sensor data and/or inputs from an external controller, and also monitors the operation of the pump unit and emits alarms and statistical reports as appropriate;

U.S. Pat. No. 5,613,844, which discloses a submersible electronic drive module, which comprises a heat sink for vehicle in-tank fuel pump and includes a drive module wherein said inner layer comprises an elastomeric material molded around said drive module, wherein said elastomeric material is flourosilicone;

WO 02063166, which discloses electronic fluid pump with encapsulated stator assembly, which comprises a fluid pump which includes a pump housing having a housing cavity with an inlet and an outlet and has an encapsulated stator assembly positioned within the housing cavity and at least partially defines a fluid passage from the inlet to the outlet;

U.S. Pat. No. 4,437,811, which discloses a submersible pump with alternate pump operation control means, which comprises a step memory to provide signal at start of pump operation every other time liquid sensor detects liquid level; and U.S. Patent Publication No. 2005/0214143, which discloses a suction distribution and disconnection system for a submersible pump, including a submersible pump system used that has guide members provided on pump distribution plate and extended from bottom surface arranged relative to opening to facilitate solids entrainment by submersible pump.

There is a need in the industry for a centrifugal waste water and sump pump that is not susceptible to problems when electrical components come in contact with fluid.

SUMMARY OF THE INVENTION

The present invention provides a new and unique apparatus for use in a submersible pump, comprising; a stator, a switch and electrical leads and connections for coupling the stator and switch together. The stator is configured with electrical windings to form a cavity to receive a rotor of a motor and to provide an electromotive force to drive the rotor arranged inside the cavity. The switch is configured with circuitry, e.g., a microprocessor board, to respond to signaling containing information about a level of fluid and to control the operation of the stator. The electrical leads and connections are configured to electrically couple the stator and the switch, and to provide power to operate the stator and the switch to drive the stator and to turn the electromotive force on and off to control the pumping of the fluid by submersible pump. The stator, the switch and electrical leads and connections are at least partly encapsulated in a material so as to form an encapsulated stator assembly with a watertight seal to prevent fluid from contacting the electrical windings of the stator, the circuitry of the switch and the electrical leads and connections so as to prevent the fluid from adversely affecting the operation of these electrical components, including causing one or more of the components to short out.

In effect, the present invention utilizes an insert molding encapsulation technique to encapsulate at least part of a motor assembly, including at least part of the stator, the electrical leads and connection, and a solid state switch, which is encapsulated as part of the entire motor assembly.

According to some embodiments of the present invention, the encapsulated stator assembly may also include one or more of the following features: one or more water passageways configured to allow fluid to pass through and cool the encapsulated stator assembly; metallic inserts configured to wick heat from the encapsulated stator assembly to the fluid; and/or a sensor configured to act as an alarm to warn of a high water level.

According to some embodiments of the present invention, the switch may take the form of a solid state switch having a low water sensor and a high water sensor configured to response to low and high water levels of fluid and to provide the signaling to the microprocessor board to control the stator; the encapsulated stator assembly may be partially or substantially encapsulated by the material; and/or the material may be a thermoplastic material.

The invention may also take the form of a submersible pump comprising: a motor having a rotor configured to pump a fluid in combination with the apparatus set forth above.

According to some embodiments, the present invention may take the form of a pump that is manufactured by inserting into a mold pump components that make up a motor stator assembly described above, electrical leads and/or connections and a solid state switch for turning the pump on and off depending on water level, and encapsulating partially or substantially the entire motor stator assembly, including: where the encapsulated assembly incorporates water passage ways to allow the fluid to cool the motor assembly; where the encapsulation assembly incorporates metallic inserts that are positioned to wick the heat from the motor stator to the fluid; where as the encapsulation assembly incorporates the low water sensor and the high water sensor for turning the pump on and off; where one or more of the sensors is connected via one or more cables to the encapsulated stator assembly so as to be adjustable for various high water levels as could be preferred for a specific application; where there is also a sensor to act as an alarm to warn of high water level; and/or where both the low and high water and/or alarm sensors are connected via a cable to the encapsulated stator assembly.

According to some embodiments, the present invention may take the form of a pump that is manufactured by inserting into a mold the pump components that make up the motor stator assembly, electrical leads and/or connections and the encapsulated assembly is placed inside an outer casing assembly that allows the pumped fluid to pass between the outer casing assembly and the encapsulated motor stator assembly, where the outer casing is molded with the encapsulated stator assembly; where the solid state switch and/or alarm forms at least part of the encapsulated stator assembly; and/or the molded stator assembly incorporates other pump system components such as, but not limited to a discharge fitting, a pump chamber, a fluid inlet, bearings, a bearing retention, a seal retention, a handle, feet, mounting provisions, or other components commonly found in pump assemblies to provide waterproof protection for these parts or components.

According to some embodiments, the present invention may take the form of a submersible pump comprising a motor having a rotor configured to pump of a fluid; and an encapsulated stator assembly comprising: a stator configured with electrical windings to form a cavity to receive a rotor of a motor and to provide an electromotive force to drive the rotor arranged inside the cavity; a switch configured with circuitry, e.g., a microprocessor board, to respond to signaling containing information about a level of fluid and to control the operation of the stator; and electrical leads and connections configured to electrically couple the stator and the switch, and to provide power to operate the stator and the switch to drive the stator and to turn the electromotive force on and off to control the pumping of the fluid by submersible pump; where the stator, the switch and electrical leads and connections are at least partly encapsulated in a material so as to form an encapsulated stator assembly with a watertight seal to prevent fluid from contacting the electrical windings, the circuitry of the switch and the electrical leads and connections so as to prevent the fluid from adversely affecting the operation of these electrical components, including causing one or more of the components to short out.

One advantage of the present invention is that it provides a waste water and sump pump that is not susceptible to problems when electrical components come in contact with fluid.

BRIEF DESCRIPTION OF THE DRAWING

The drawing, which is not necessarily drawn to scale, includes the following Figures.

DETAILED DESCRIPTION OF THE INVENTION

Figure 1A:
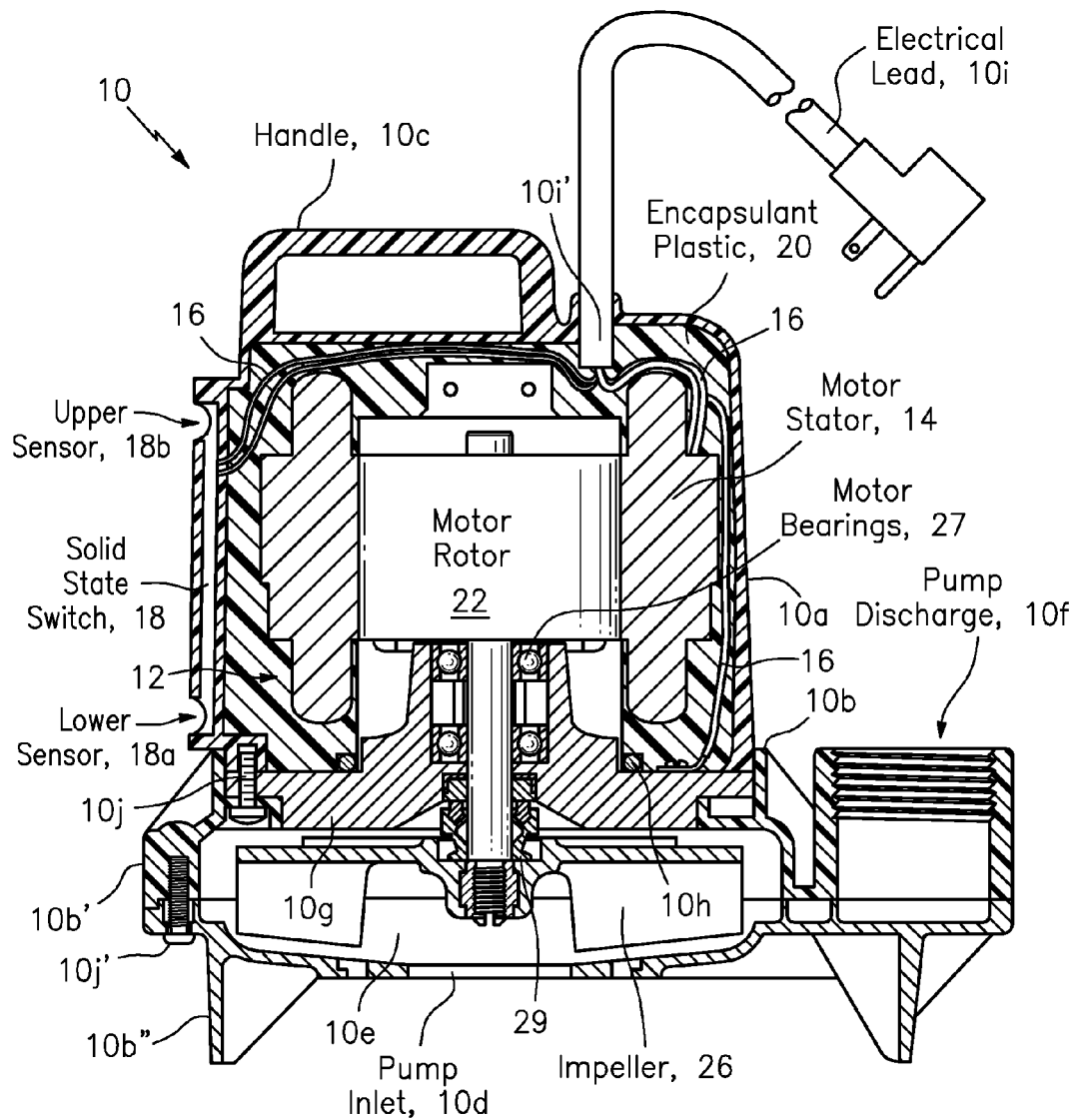
FIGS. 1a and 1b are diagrams of submersible pumps according to some embodiments of the present invention.
Figure 1B:
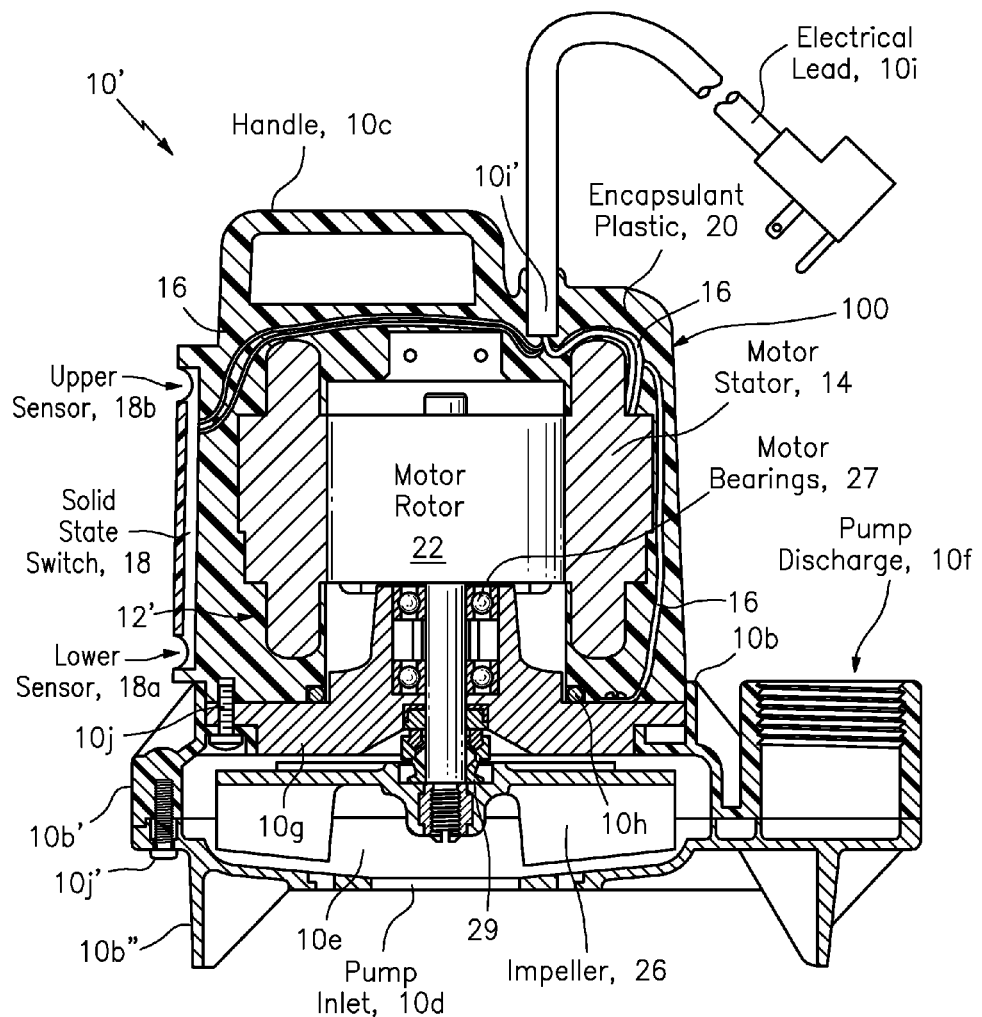

FIGS. 1a, 1b

FIG. 1a show a submersible pump generally indicated as 10 having a new and unique apparatus in the form of an encapsulated stator assembly generally indicated as 12. In general, and by way of example, the submersible pump 10 is shown having an outer casing that includes an upper casing 10a and a lower casing 10b. The upper casing 10a has a handle 10c for carrying the submersible pump 10. The lower casing 10b is configured to form a pump inlet 10d, an rotor/impeller cavity 10e, and a pump discharge 10f. The lower casing 10b may also be configured with or contain a member 10g arranged therein consistent with that described below, as well as an O-ring 10h for providing a suitable water-tight seal between the member 10g and the encapsulated stator assembly 12. The submersible pump 10 also has an electrical lead and outlet plug 10i for plugging into an electrical socket (not shown) for providing power to electrical components of the submersible pump 10. Generally, pumps, including submersible pumps, are known in the art having one or more of the features identified in relation to reference labels 10a, 10b, 10c, . . . , 10h; and the scope of the present invention is not intended to be limited to the configuration or formation of such features as shown and described herein. For example, embodiments of the present invention are envisioned in which the pump has other types or kinds of such features, e.g., no handle at all, a pump inlet or discharge having a different configuration than that shown herein, an rotor/impeller cavity having a different configuration than that shown herein, etc. By way of example, the present invention is described in relation to a submersible pump, which is understood to be any type or kind of pump that may be arranged in a fluid, cover by a fluid, including but not limited to a sump pump, a bilge pump, a well pump, etc.

According to some embodiments of the present invention, the encapsulated stator assembly 12 may comprise a stator 14 having electrical windings; electrical leads and connections 16; a switch 18 having circuitry, e.g. a microprocessor board; and an encapsulating material or encapsulant generally indicated as 20.

According to some embodiments of the present invention, the stator 14 may be configured with the electrical windings to form a cavity to receive a rotor 22 of a motor assembly in the rotor/impeller cavity 10e and to provide an electromotive force to drive the rotor 16 inside the rotor/impeller cavity 10e. Stators having electrical windings are known in the art, and the scope of the invention is not intended to be limited to any particular type or kind either now known or later developed in the future.

According to some embodiments of the present invention, the switch 18 may be configured with circuitry to respond to a level of fluid surround the submersible pump 10 and to control the operation of the stator 14 to turn the electromotive force on and off to drive the rotor 16 to control the pumping of the fluid by the submersible pump 10. By way of example, the switch 18 may comprise a solid state switch, e.g., having a microprocessor board, for controlling the provisioning or switching of electrical power through the windings of the stator 14 to control the operation of the stator 14 and the submersible pump 10. Solid state switches are known in the art, including switches using capacitive-based sensing, and the scope of the invention is not intended to be limited to any particular type or kind thereof either now known or later developed in the future. By way of example, according to some embodiments of the present invention, the solid state switch 18 may include a lower or low water sensor 18a and an upper or high water sensor 18b configured to respond respectively to low and high water levels of fluid and provide signaling, e.g., to the microprocessor board, to control the stator 14. The microprocessor board may be configured to control the provisioning or switching of electrical power via the electrical leads and connections 16 to the windings of the stator 14 to control the operation of the stator 14 and the pump 10 based at least partly on the signaling received from the sensors 18a, 18b.

The electrical leads and connections 16 are configured to electrically couple the stator 14 and the switch 18, and to provide power to operate the stator 14 and the switch 18 to drive the stator 14 and to turn the electromotive force on and off to control the pumping of the fluid by the submersible pump 10. The rotor 16 and an impeller 26 are arranged in relation to the member 10g as shown, and the rotor 16 is coupled via motor bearings 27 and a fluidic seal coupling 29 to the impeller 26 as shown for turning in the rotor/impeller cavity 10e and pumping fluid from the pump inlet 10c, through the rotor/impeller cavity 10e, and out the pump discharge 10f. The scope of the invention is not intended to be limited to the manner in which the rotor 16, the impeller 26 and the member 10g are arranged, formed or configured in relation to one another; and embodiments are envisioned in which the rotor 16, the impeller 26 and the member 10g have a different arrangement, formation, or configuration in relation to one another within the spirit of the present invention.

According to some embodiments of the present invention, the stator 14, the electrical leads and connections 16 and the switch 18 may be at least partly encapsulated in a material so as to form the encapsulated stator assembly 12 with a watertight seal to prevent fluid from contacting the electrical windings of the stator 14, the circuitry of the switch 18 and the electrical leads and connections 16 so as to prevent the fluid from adversely affecting the operation of these electrical components, including causing one or more of the components to short out. For example, as shown a part 10i' of the sheathing of the electrical lead 10i is embedded in the encapsulating material or encapsulant 20 so as to form a watertight seal around the part 10i' of the sheathing. Encapsulating materials or encapsulants, like element 20, are known in the art, and the scope of the invention is not intended to be limited to any particular type or kind thereof either now known or later developed in the future. By way of example, the encapsulating material or encapsulant 20 may take the form of thermoplastic materials, such as a thermoplastic, which may also be known as thermosoftening plastic, and is a polymer that turns to a liquid when heated and freezes to a very glassy state when cooled sufficiently. For example, thermoplastics can take the form of high-molecular-weight polymers whose chains associate through weak Van der Waals forces (polyethylene); stronger dipole-dipole interactions and hydrogen bonding (nylon); or even stacking of aromatic rings (polystyrene). Thermoplastic polymers may differ from thermosetting polymers (Bakelite) in that they can be remelted and remoulded. Thermoplastic materials may have addition polymers; e.g., vinyl chain-growth polymers such as polyethylene and polypropylene.

In FIG. 1a, the submersible pump 10 is shown with the outer casing, which is understood to be optional, and where the upper casing 10a, the lower casing 10b and the encapsulating material 20 are formed as separate units, parts or pieces that must be assembled or coupled together. By way of example, as shown the member 10g is coupled to the upper casing 10a using a fastener 10j. The lower casing 10b may be formed as two parts 10b' and 10b", where the one part 10b" of lower casing 10b is coupled to the other part 10b' of the lower casing 10b using a fastener 10j'. Embodiments are also envisioned in which the one part 10b" of lower casing 10b is coupled to the upper casing 10a using a fastener like 10j'. The scope of the invention is not intended to be limited to the manner in which such parts or casings are coupled together or the type or kind of fasteners used to couple the same.

FIG. 1b shows an alternative embodiment of the submersible pump 10 generally indicated as 10', in which in which the upper casing 10a, the lower casing 10b and the encapsulating material 20 are formed as an integral unit 100 so as to form an encapsulated stator assembly 12', comprising the stator 14 having electrical leads and connections 16; the switch 18; and the encapsulating material or encapsulant 20, either with or without the handle 10c. The scope of the invention is intended to include such embodiments like that shown in FIG. 1b. As shown the member 10g is coupled to the encapsulated stator assembly 12' using the fastener 10j, and two parts of the lower casing 10b are coupled together using the fastener 10j', although the scope of the invention is not intended to be limited to the manner in which such parts are coupled together or the type or kind of fasteners used to couple the same.

Figure 2:
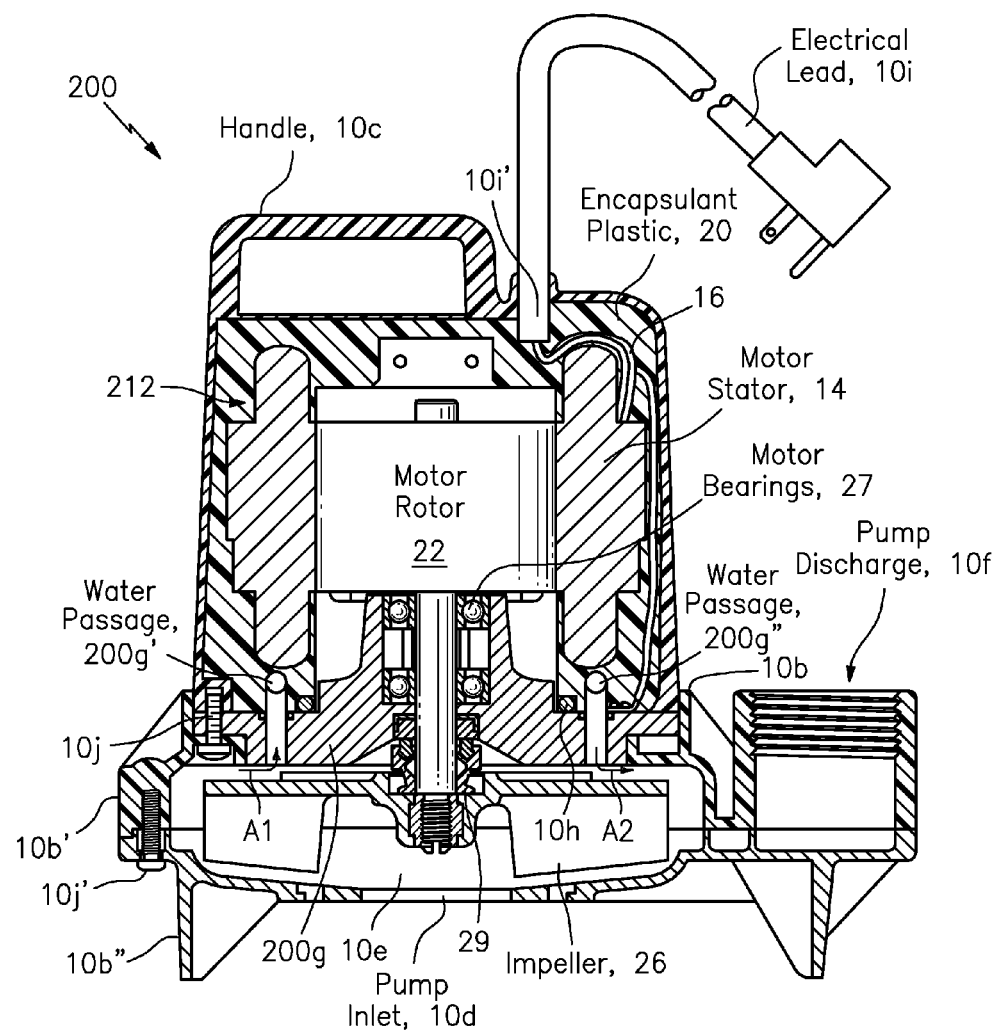
FIG. 2 is a diagram of a submersible pump having an encapsulated stator assembly with water passageways according to some embodiments of the present invention.

FIG. 2: Fluid Passageways 222

FIG. 2 shows an alternative embodiment of a submersible pump generally indicated as 200 according to some embodiments of the present, where an encapsulated stator assembly 212 further comprises one or more fluid or water passageways 222 configured or formed in an encapsulated material 220 to allow fluid to pass through and cool the encapsulated stator assembly 212. (The switch 18 in FIGS. 1a and 1b is not shown in FIG. 2.) Moreover, consistent with that shown, the submersible pump 200 has a member 200g configured to form one or more corresponding passageways indicated by reference label 200g' configured to allow the fluid to pass from the rotor/impeller cavity 200e into the one or more fluid or water passageways 222 as shown by arrow A1, and configured to form one or more other corresponding passageways indicated by reference label 200g" to allow the fluid to pass from the one or more fluid or water passageways 222 back into the rotor/impeller cavity 10e and out to the pump discharge 10f as shown by arrow A2. By way of example, the encapsulated material 220 can be molded with the one or more fluid or water passageways 222 formed therein using thermoplastic molding technique known in the art. The scope of the invention is not intended to be limited to the manner or way in which the one or more fluid or water passageways 222 are configured, formed or molded in the encapsulated material 220. Other parts of the submersible pump 100 and encapsulated stator assembly 212 consistent with that shown in FIG. 1 are not labeled or described in relation to the alternative embodiment shown in FIG. 2.

Figure 3:
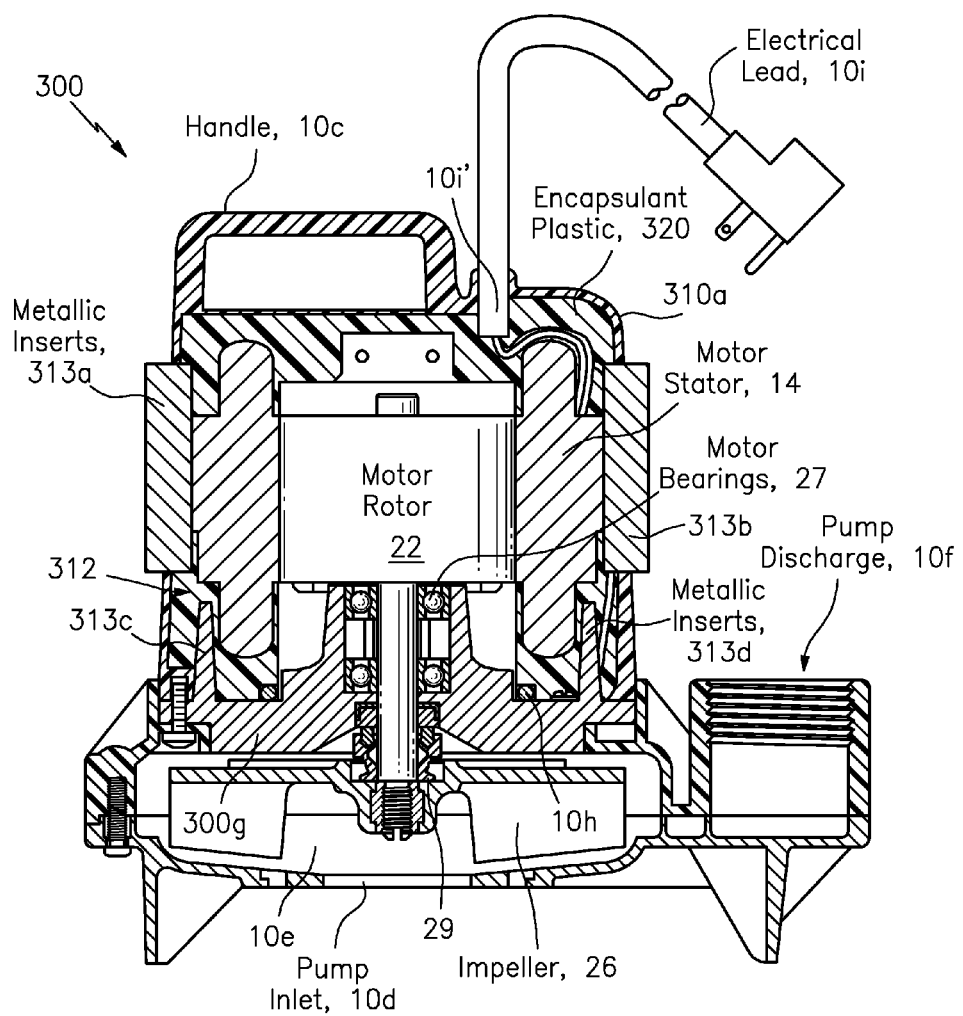
FIG. 3 is a diagram of a submersible pump having an encapsulated stator assembly with metallic inserts according to some embodiments of the present invention.

FIG. 3: Metal Inserts 313a, 313b, 313c, 313d

FIG. 3 shows an alternative embodiment of a submersible pump generally indicated as 300 according to some embodiments of the present, where the encapsulated stator assembly 312 may further comprise metallic inserts 313a, 313b, 313c, 313d configured to wick heat from the encapsulated stator assembly 312 to the fluid. By way of example, the encapsulated material 320 can be molded with the one or more metallic inserts 313a, 313b, 313c, 313d formed therein so as to form the encapsulated stator assembly 312 using thermoplastic molding technique known in the art. The scope of the invention is not intended to be limited the manner or way in which the one or more metallic inserts 313a, 313b, 313c, 313d are configured, formed or molded in the encapsulated material 320, or the number or arrangement of the one or more metallic inserts 313a, 313b, 313c, 313d configured, formed or molded in the encapsulated material 320. For example, embodiments are envisioned in which the one or more metallic inserts 313a, 313b are configured as a continuous ring about the encapsulated stator assembly 312.

In embodiments having an outer casing assembly as shown in FIG. 3, an upper casing 310a can be suitably adapted, formed or configured to either fit around the one or more metallic inserts 313a, 313b as shown, or alternatively enclose the one or more metallic inserts 313a, 313b, which is not shown.

Moreover, consistent with that shown, the submersible pump 300 may be configured with a member 300g that may include some of the one or more metallic inserts like metallic inserts 313c, 313d. In this embodiment, by way of example, the encapsulated material 320 can be molded with passages, cavities or openings configured, shaped or formed to receive the one or more metallic inserts 313c, 313d of the member 300g using thermoplastic molding technique known in the art. The scope of the invention is not intended to be limited the manner or way in which the one or more metallic inserts 313a, 313b, 313c, 313d are configured or formed in the encapsulated material 320 or the member 300g. Other parts of the submersible pump 300 and encapsulated stator assembly 312 consistent with that shown in FIG. 1 are not labeled or described in relation to the alternative embodiment shown in FIG. 3.

Figure 4:
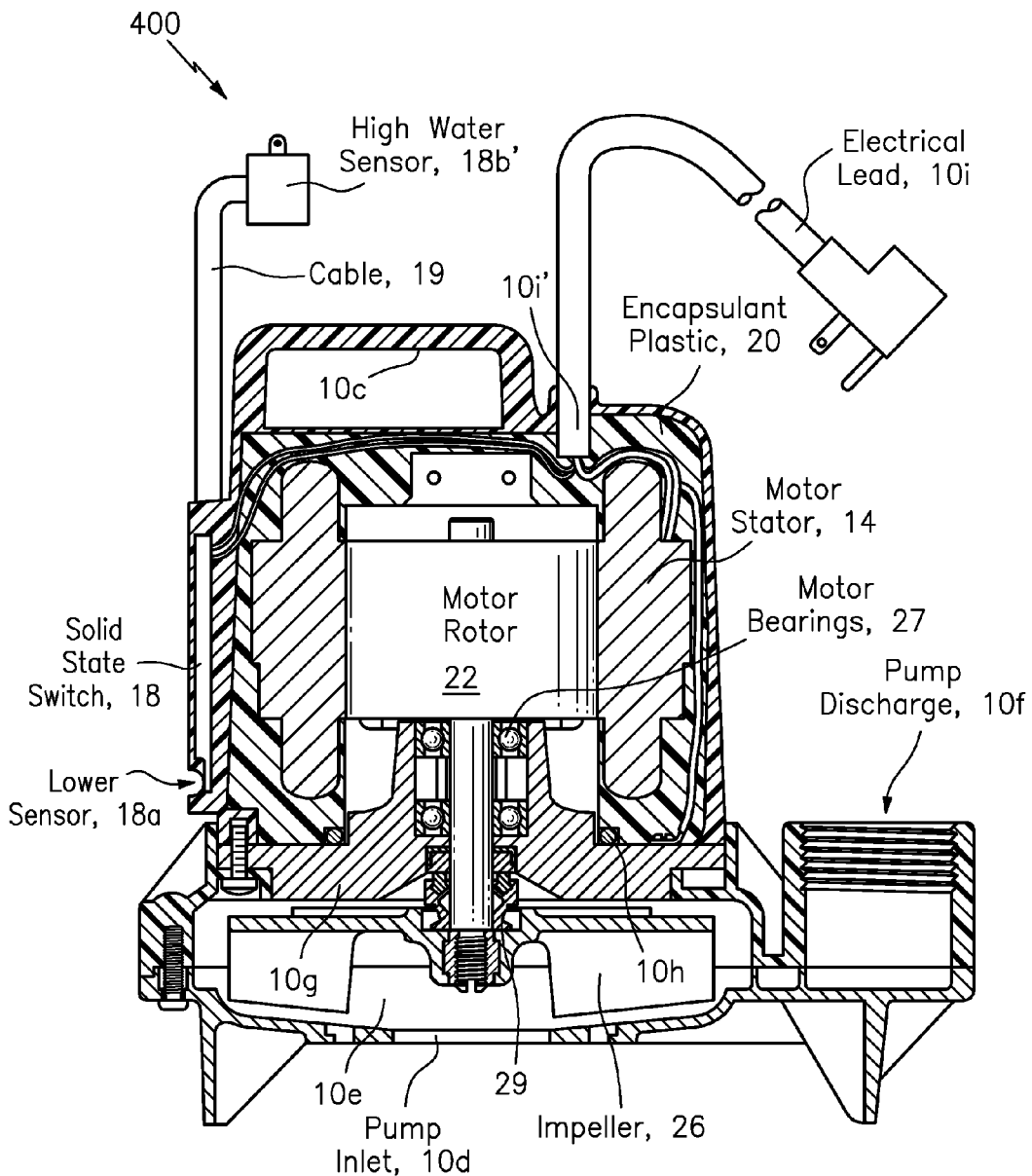
FIG. 4 is a diagram of a submersible pump having a high water sensor coupled via a cable according to some embodiments of the present invention.

FIG. 4: The High Water Sensor 18b'

FIG. 4 shows an alternative embodiment of a submersible pump generally indicated as 400 according to some embodiments of the present, where the submersible pump 400 comprises a high water sensor 18b' configured to couple to the switch 18 via a cable 19 and to act as an alarm to warn of a high water level. High water sensors like element 18b' configured to couple to a switch and to act as an alarm to warn of a high water level are known in the art and the scope of the invention is not intended to be limited to any particular type or kind either now known or later developed in the future. Consistent with that described above, the switch 18 may take the form of a solid state switch having a lower sensor water level, as shown. Other parts of the submersible pump 400 and encapsulated stator assembly consistent with that shown in FIG. 1 are not labeled or described in relation to the alternative embodiment shown in FIG. 4.

Figure 5:
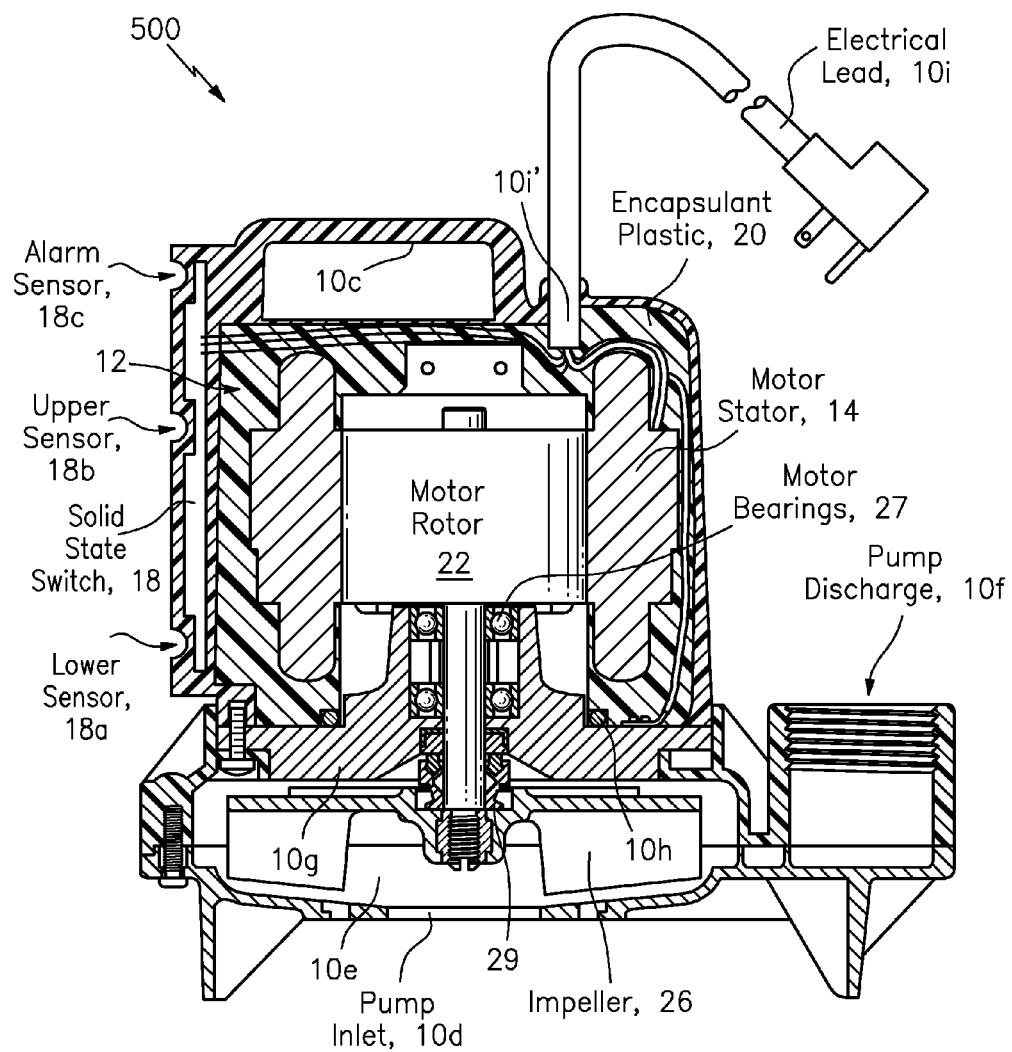
FIG. 5 is a diagram of a submersible pump having an encapsulated stator assembly with an alarm sensor according to some embodiments of the present invention.

FIG. 5: The Alarm Sensor 18c

FIG. 5 shows an alternative embodiment of a submersible pump generally indicated as 500 according to some embodiments of the present, where the switch 18 may comprise an alarm sensor 18c. In operation, the switch 18, which may take the form of a solid state switch, has a low water sensor 18a and a high water sensor 18b configured to response to low and high water levels of fluid and control the operation of the stator 14, and also has the alarm sensor 18c configured to sense a high water level. Solid state switches are known in the art and the scope of the invention is not intended to be limited to any particular type or kind either now known or later developed in the future.

Figure 6:
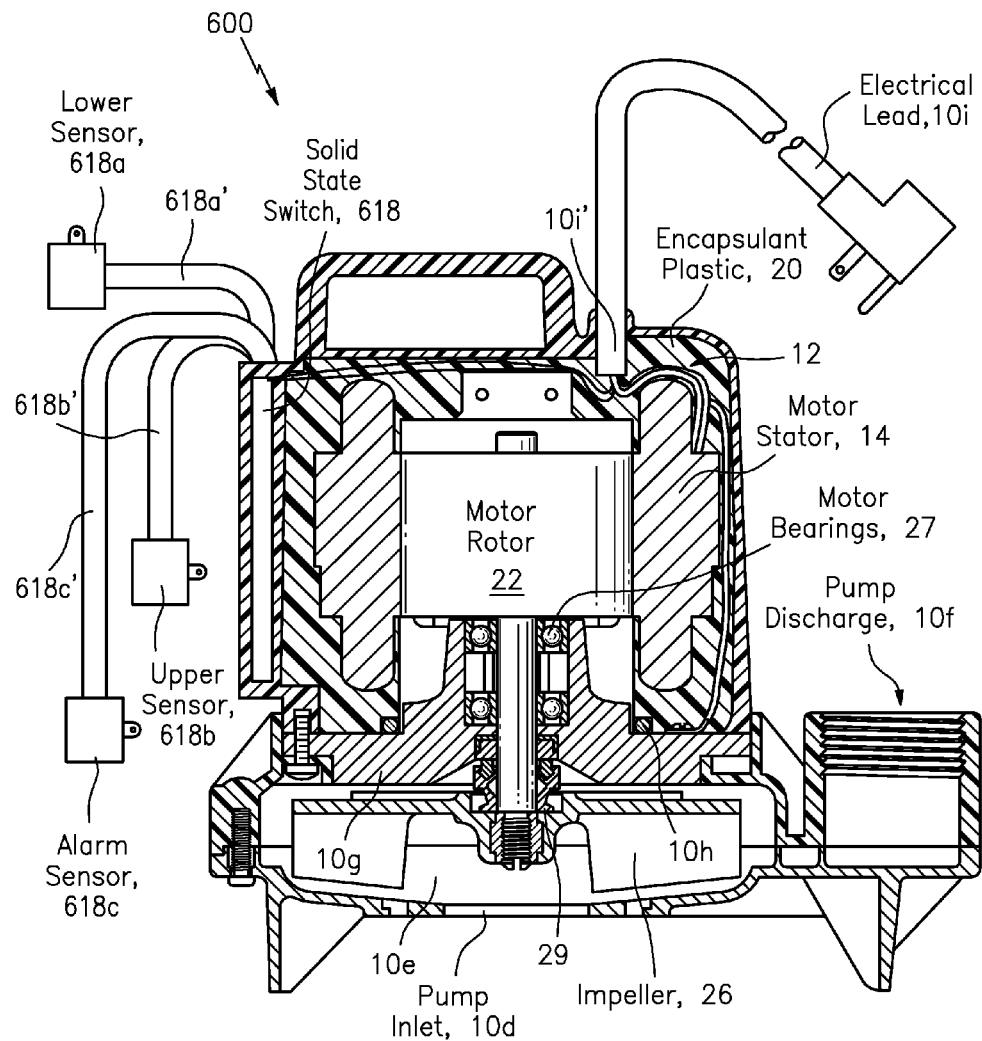
FIG. 6 is a diagram of a submersible pump having an encapsulated stator assembly with sensors coupled via cables according to some embodiments of the present invention.

FIG. 6: The High Water Sensor

FIG. 6 shows an alternative embodiment of a submersible pump generally indicated as 600 according to some embodiments of the present, where the submersible pump 600 comprises a lower sensor 618a, an upper sensor 618b and alarm sensor 618c configured to couple to a switch 618. The lower sensor 618a is configured to sense a low fluid level, and to provide a low sensor signal containing information about the low fluid level being sensed; the upper sensor 618b is configured to sense an upper fluid level, and to provide a upper sensor signal containing information about the upper fluid level being sensed; and the alarm sensor 618c is configured to sense an alarm fluid level, and to provide an alarm sensor signal containing information about the alarm fluid level being sensed. Such sensors are known in the art, and the scope of the invention is not intended to be limited to any particular type or kind either now known or later developed in the future. The sensors 618a, 618b, 618c are coupled to the switch 618 using watertight electrical cabling 618a', 618b', 618c', that is known in the art. Consistent with that described above, the switch 618 may take the form of a solid state switch, as shown. Other parts of the submersible pump 600 and encapsulated stator assembly consistent with that shown in FIG. 1 are not labeled or described in relation to the alternative embodiment shown in FIG. 6.

FIGS. 7-8

Figure 7:
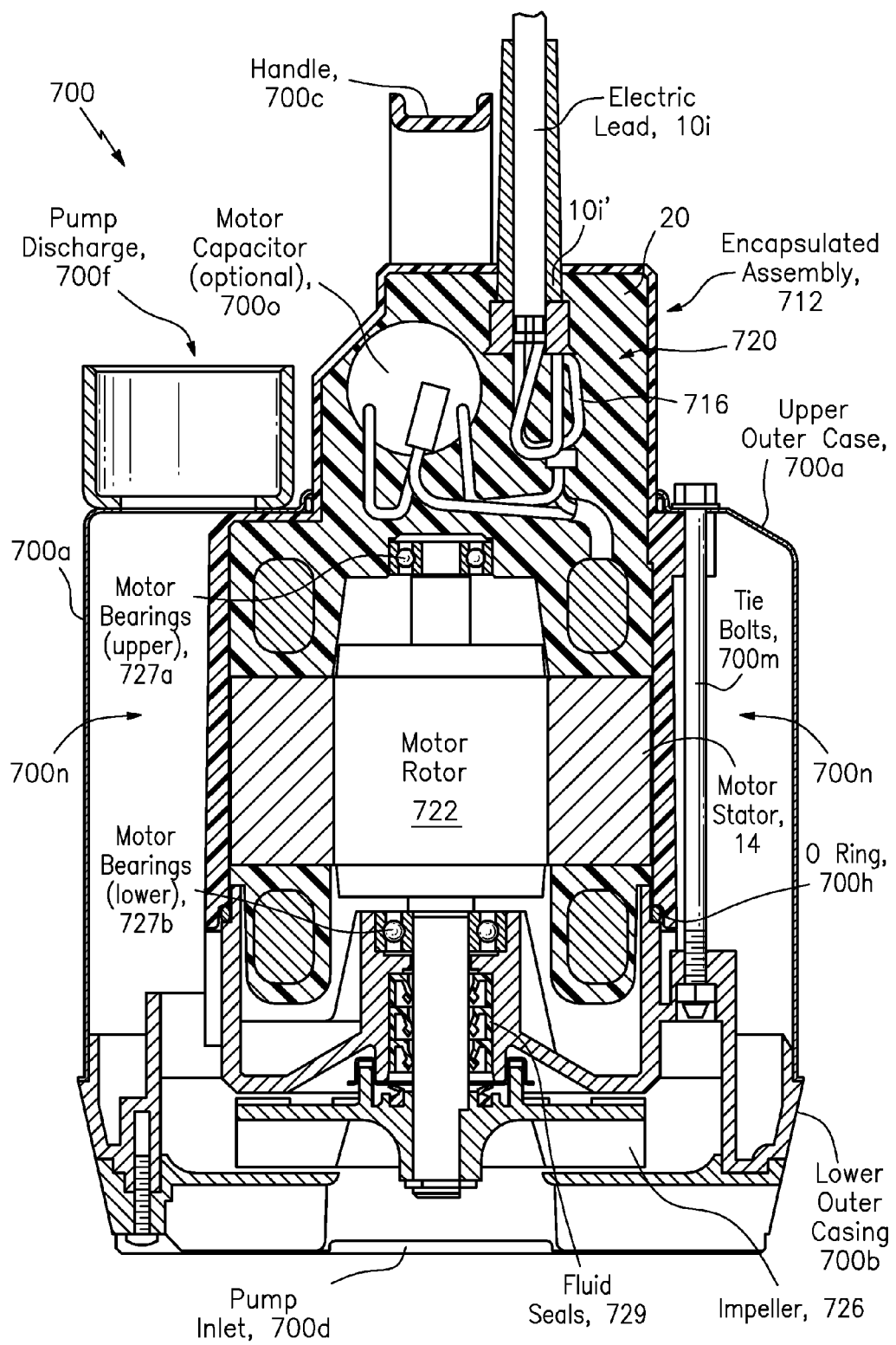
FIG. 7 is a diagram of a submersible pump having an encapsulated stator assembly coupled to an outer casing according to some embodiments of the present invention.

FIG. 7 shows an alternative embodiment of a submersible pump generally indicated as 700 according to some embodiments of the present, where the submersible pump 700 is manufactured by inserting into a mold pump components that make up a motor stator assembly, electrical leads and/or connections, and an encapsulated stator assembly is placed inside an outer case assembly that allows pumped fluid to pass between the outer case assembly and the encapsulated stator assembly.

In FIG. 7, the submersible pump 700 includes an outer casing assembly having an upper outer casing 700a and a lower outer casing 700b. An encapsulated motor stator assembly 720 is arranged inside the outer casing with tie bolts 700m coupling together the upper outer casing 700a, the encapsulated stator assembly 720 and a lower outer casing 700b. In operation, an impeller 726 draws fluid into a pump inlet 700d, where the fluid passes through a cavity generally indicated as 700n formed between the upper outer case 700a and the encapsulated motor stator assembly 720, as shown.

The submersible pump 700 also includes a motor rotor 722 having upper motor bearings 727a and lower motor bearings 727b and also includes a fluid seal 729 for coupling to the impeller 726. An O-ring 700h is arranged between the encapsulated motor stator assembly 720 and the lower outer casing 700b. As shown, the submersible pump 700 also includes a pump discharge 700f, an optional motor capacitor 700o, a handle 700c and electrical leads and connections 716 passing through the encapsulating material.

Figure 8:
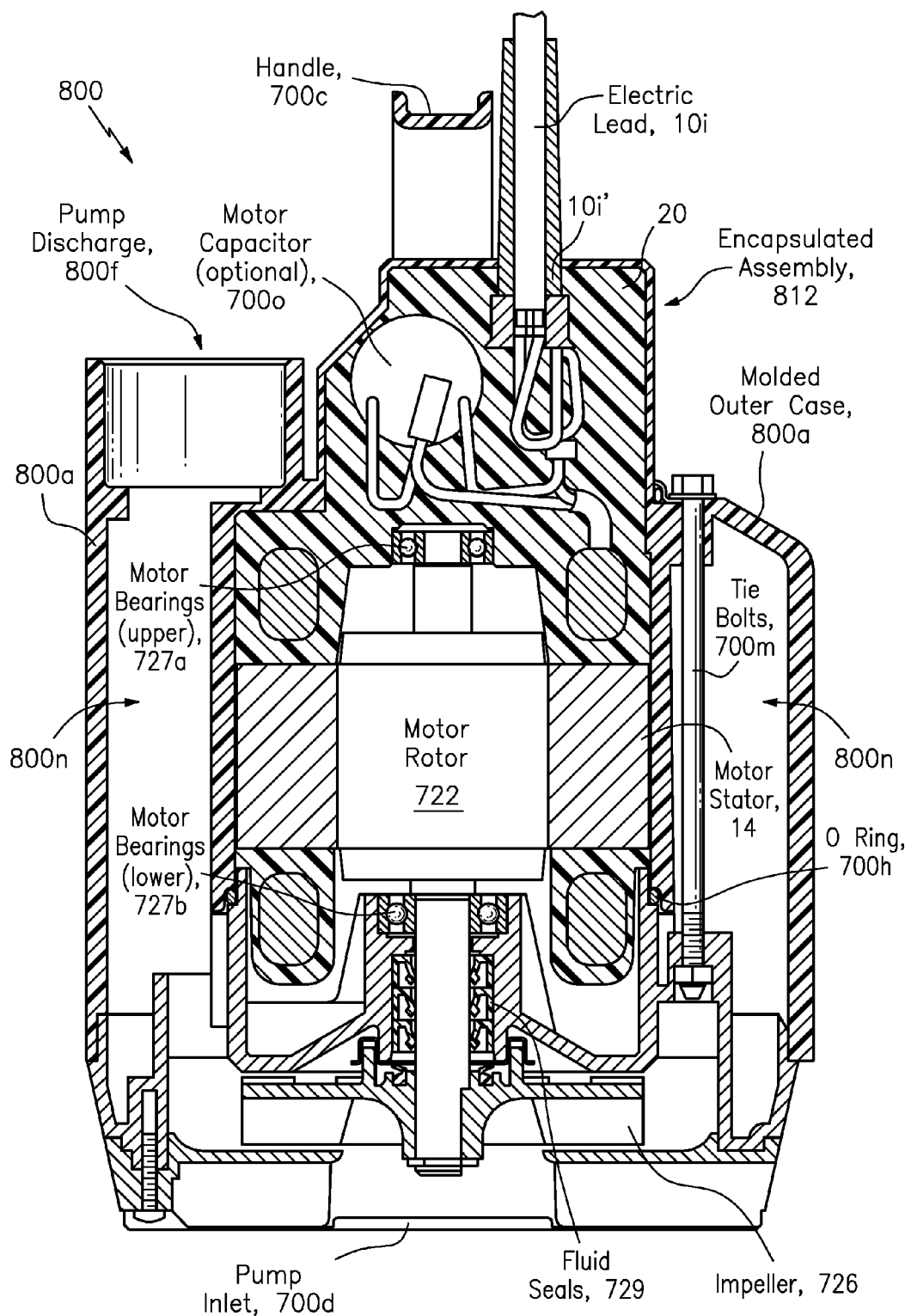
FIG. 8 is a diagram of a submersible pump having an encapsulated stator assembly and casing according to some embodiments of the present invention.

FIG. 8 shows still another alternative embodiment of a submersible pump generally indicated as 800 according to some embodiments of the present, where the submersible pump 800 has an outer casing assembly with a molded upper outer casing 800a that is molded as part of the encapsulated assembly 812.

Other parts of the submersible pumps 700 and 800 and encapsulated stator assembly consistent with that shown in FIG. 1 are not labeled or described in relation to the alternative embodiment shown in FIGS. 7 and 8.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

I claim:

1. A submersible waste water and sump pump configured to be immersed in a fluid, comprising:
    a motor rotor configured to pump of the fluid surrounding the submersible waste water and sump pump; and
    an encapsulated stator assembly comprising:
        a stator configured with electrical windings to form a cavity to receive the motor rotor and to provide an electromotive force to drive the motor rotor arranged inside the cavity;
        a solid state switch having a low water sensor, a high water sensor and switching circuitry, the low water sensor and the high water sensor configured to respond to low and high water levels of the fluid and to provide signaling containing information about the low and high water levels of the fluid, and the switching circuitry configured to receive the signaling and provide corresponding signaling to control the operation of the stator by turning the electromotive force on and off to drive the motor rotor to control the pumping of the fluid by the submersible waste water and sump pump, based at least partly on a sensed level of fluid surrounding the submersible waste water and sump pump;
        electrical leads and connections configured to electrically couple the stator and the solid state switch, and to provide power to operate the stator and the solid state switch to drive the stator and to turn the electromotive force on and off to control the pumping of the fluid by the submersible waste water and sump pump; and
        a thermoplastic material configured to at least partially encapsulate the stator, the solid state switch and electrical leads and connections so as to form the encapsulated stator assembly with a watertight electrical seal to prevent the fluid from contacting the electrical windings, the switching circuitry of the solid state switch and the electrical leads and connections when the submersible waste water and sump pump is immersed in the fluid; and
    the encapsulated stator assembly being configured as an integrated watertight manufactured unit so as to receive the motor rotor when the submersible waste water and sump pump is assembled.

2. A submersible waste water and sump pump according to claim 1, wherein the encapsulated stator assembly further comprises one or more water passageways configured to allow fluid to pass through and cool the encapsulated stator assembly.

3. A submersible waste water and sump pump according to claim 1, wherein the encapsulated stator assembly further comprises metallic inserts formed in the thermoplastic material configured to wick heat from the encapsulated stator assembly to the fluid.

4. The encapsulated stator assembly according to claim 3, wherein the metallic inserts are configured as a continuous ring about the stator assembly.

5. The submersible waste water and sump pump according to claim 1, wherein the submersible waste water and sump pump comprises a first, upper casing portion configured with a handle for carrying said submersible waste water and sump pump and a second, lower casing portion is configured to form a pump inlet, an impeller cavity and a pump discharge.

6. The submersible waste water and sump pump according to claim 5, wherein the first, upper casing portion, the second, lower casing portion and the thermoplastic material are formed as an integral unit.

7. An encapsulated stator assembly configured for use in a submersible waste water and sump pump that is immersed in a fluid, wherein the encapsulated stator assembly comprises:
    a stator configured with electrical windings to form a cavity to receive a motor rotor that is configured to pump of the fluid in which the submersible waste water and sump pump is immersed, the stator also configured to provide an electromotive force to drive the motor rotor arranged inside the cavity;
    a solid state switch having a low water sensor, a high water sensor and switching circuitry, the low water sensor and the high water sensor configured to respond to low and high water levels of the fluid and to provide signaling containing information about the low and high water levels of the fluid, and the switching circuitry configured to receive the signaling and provide corresponding signaling to control the operation of the stator by turning the electromotive force on and off to drive the motor rotor to control the pumping of the fluid by the submersible waste water and sump pump, based at least partly on a sensed level of fluid surrounding the submersible waste water and sump pump;

electrical leads and connections configured to electrically couple the stator and the solid state switch, and to provide power to operate the stator and the solid state switch to drive the stator and to turn the electromotive force on and off to control the pumping of the fluid by the submersible waste water and sump pump; and a thermoplastic material configured to at least partially encapsulate the stator, the solid state switch and electrical leads and connections so as to form the encapsulated stator assembly with a watertight electrical seal to prevent the fluid from contacting the electrical windings, the switching circuitry of the solid state switch and the electrical leads and connections when the submersible waste water and sump pump is immersed in the fluid; and the encapsulated stator assembly being configured as an integrated watertight manufactured unit so as to receive the motor rotor when the submersible waste water and sump pump is assembled.

8. An encapsulated stator assembly according to claim 7, wherein the encapsulated stator assembly further comprises one or more water passageways configured to allow fluid to pass through and cool the encapsulated stator assembly.

9. An encapsulated stator assembly according to claim 7, wherein the encapsulated stator assembly further comprises metallic inserts formed in the thermoplastic material configured to wick heat from the encapsulated stator assembly to the fluid.

10. An encapsulated stator assembly according to claim 9, wherein the metallic inserts are configured as a continuous ring about the stator assembly.

11. An encapsulated stator assembly according to claim 8, wherein the submersible waste water and sump pump comprises a first, upper casing portion configured with a handle for carrying said submersible waste water and sump pump and a second, lower casing portion is configured to form a pump inlet, an impeller cavity and a pump discharge.

12. An encapsulated stator assembly according to claim 11, wherein the first, upper casing portion, the second, lower casing portion and the thermoplastic material are formed as an integral unit.

* * * * *